US012603545B2

(12) United States Patent
Umlandt

(10) Patent No.: US 12,603,545 B2
(45) Date of Patent: Apr. 14, 2026

(54) AXIALLY SECURING A SHAFT COMPONENT OF AN ELECTRIC MACHINE

(71) Applicant: Schaeffler Technologies AG & Co. KG, Herzogenaurach (DE)

(72) Inventor: Julian Umlandt, Bischweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 205 days.

(21) Appl. No.: 18/265,005

(22) PCT Filed: Dec. 3, 2021

(86) PCT No.: PCT/DE2021/100965
§ 371 (c)(1),
(2) Date: Jun. 2, 2023

(87) PCT Pub. No.: WO2022/122076
PCT Pub. Date: Jun. 16, 2022

(65) Prior Publication Data
US 2024/0006956 A1 Jan. 4, 2024

(30) Foreign Application Priority Data
Dec. 7, 2020 (DE) ..................... 10 2020 132 470.7

(51) Int. Cl.
*H02K 7/00* (2006.01)
*H02K 15/02* (2006.01)

(52) U.S. Cl.
CPC ............. *H02K 7/003* (2013.01); *H02K 15/02* (2013.01)

(58) Field of Classification Search
CPC ............................... H02K 7/003; H02K 15/02
See application file for complete search history.

(56) References Cited

U.S. PATENT DOCUMENTS

| 9,318,924 | B2 | 4/2016 | Taguchi et al. |
| 2012/0248920 | A1 | 10/2012 | Takahashi et al. |

FOREIGN PATENT DOCUMENTS

| DE | 2062419 | 6/1972 |
| DE | 102015014535 | 7/2016 |
| EP | 1530278 | 5/2005 |
| EP | 2560268 | 2/2013 |
| EP | 2154767 | 3/2017 |
| JP | 60096164 | 5/1985 |
| JP | 2014064409 | 4/2014 |
| JP | 2016201896 | 12/2016 |
| JP | 20199898 | 1/2019 |

*Primary Examiner* — Terrance L Kenerly
(74) *Attorney, Agent, or Firm* — Volpe Koenig

(57) ABSTRACT

A shaft system including a shaft having a peripheral groove extending in the circumferential direction, and further including a securing device as well as an interlocking connection by a deformation of the securing device into the groove. The securing device forms a first axial stop for a shaft component. The securing device includes a second axial stop. Also disclosed are an electric machine having the shaft system as well as a process for manufacturing the shaft system.

13 Claims, 4 Drawing Sheets

AXIALLY SECURING A SHAFT COMPONENT OF AN ELECTRIC MACHINE

CROSS-REFERENCE TO RELATED APPLICATIONS

This application is the U.S. National Phase of PCT Appln. No. PCT/DE2021/100965, filed Dec. 3, 2021, which claims priority from German Patent Application No. 10 2020 132 470.7, filed Dec. 7, 2020, the entire disclosures of which are incorporated by reference herein.

TECHNICAL FIELD

The present disclosure relates to a shaft system of an electric machine, an electric machine, and a method for producing a shaft system.

BACKGROUND

In shaft systems, depending on the function to be performed, the axial securing of shaft components on the shaft can be required. This can be achieved in the axial direction via corresponding stops.

In particular with reference to electric machines, the prior art generally provides for an axial stop in a shaft system to be implemented via a shaft shoulder or a shaft flange. If shaft components have to be pushed onto a portion of the shaft up to such an axial stop, the use of a shaft nut, for example, as a second axial stop is also known. In addition to providing for the axial securing, an axial pretensioning force can also be applied via the shaft nut. Alternatively, so-called snap rings are known which are introduced into grooves and thus form an axial stop.

JP2016201896A describes a shaft system of an electric machine in which a rotor is mounted on a shaft, wherein the rotor has a shaft flange or shaft shoulder as an axial stop on one side. On the opposite side, a ring is mounted on the shaft as an axial stop. The assembly is carried out by means of a transverse press fit, which is implemented by the characteristic shape of the ring in combination with axial press-fitting.

EP2154767B1 describes a shaft system of an electric machine in which a rotor forms a shaft flange as an axial stop on one side. On the opposite side, an axial stop is implemented by caulking an annular element into a peripheral groove of the shaft by means of a multi-part tool.

In addition to axial securing, a further requirement can be rotational securing or the tangential bidirectional transmission of forces between the shaft and shaft components. According to the prior art, this can be achieved, for example, by means of transverse press fits, grooves, profiled shafts and splines.

DE2062419A1 shows a spline for rotationally securing laminated cores of a rotor. In JP60096164A2 as well as JP2014064409 A2, profiled shafts with corresponding counter-profiles in the shaft components are described.

The designs described above have in common that a significant cost factor in the manufacture of a shaft system is due to the implementation of the axial stops and the rotational securing. Either high manufacturing efforts are required or complex assembly devices have to be employed.

A prior art shaft system is also known from EP2154767B1.

SUMMARY

It is therefore the object of the present disclosure to implement a shaft system for an electric machine that is as simple and inexpensive as possible.

The object is achieved by the measures described herein. Advantageous embodiments are described below and in the claims.

According to one aspect, a shaft system has a shaft with a peripheral groove extending in the circumferential direction, a securing device, and an interlocking connection. The interlocking connection is implemented by a deformation of the securing device into the groove. The securing device forms a first axial stop for a shaft component. The securing device has a second axial stop.

According to one embodiment, the securing device is tubular with a constant wall thickness in the region of the deformation.

In particular, regions of the securing device provided for deformation are defined in their axial length such that correct deformation is possible in all axial installation situations on the shaft resulting from component tolerances. The resulting greater length of the region provided for deformation has a positive effect on any axial deformation of the end faces of the securing device.

According to a further embodiment, the interlocking connection is realized by a plurality of radial deformations of the securing device in the groove, distributed in the circumferential direction.

It is advantageous if the deformation is effected radially and partially, for example by means of metal stamps. A high number of deformations and an associated reduction in a force required for deformation is particularly advantageous, as an axial material expansion at the end faces of the securing device is minimized and evenly distributed, in particular if these are designed as sleeves. By minimizing this axial deformation, a second stop can be implemented in addition to the first stop, which can also be used as a stop surface for rolling bearings, for example. The process of introducing the deformation is also referred to as caulking.

According to an advantageous embodiment, the shaft has a first peripheral groove extending in the circumferential direction and a second peripheral groove extending in the circumferential direction. Furthermore, the securing device has a first securing device and a second securing device, which each comprise the interlocking deformation, the first stop and the second stop. In this case, the first securing device has the first interlocking connection to the first groove at a first location on the shaft. In addition, the second securing device forms the second interlocking connection to the second groove at a second location of the shaft. A shaft component is arranged in this case between the first axial stop of the first securing device and the first axial stop of the second securing device.

The first securing device and the second securing device are advantageously designed as identical components.

The fit of the first securing device can be designed as an interference fit. This enables an exact axial positioning of the securing device and thus also of the shaft component. There is preferably a slight clearance fit at the second securing device. This reduces the assembly force and allows a precise setting of an axial pretensioning force. Since the securing devices are identical parts, the fit is set by selecting the outer diameter of the shaft accordingly.

According to a further embodiment, the shaft component has a plurality of components.

Advantageously, the shaft component is a rotor core of an electric machine. In this regard, the rotor core comprises a first balancing disk and a first laminated core. In particular, the rotor core can include further elements such as further rotor cores as well as a second balancing disk.

The balancing disk can advantageously be stamped from sheet metal. The interior of the balancing disk can be designed to be potted. This potting represents a spring element in the combination of components and can, in addition to component tolerances, also compensate for an increasing pretensioning force that can result from different coefficients of thermal expansion of the individual components during operation.

According to a further aspect, an electric machine comprises a shaft system according to the aspect and embodiments described above.

According to a further aspect, a method for producing a shaft system, preferably according to the aspect or its embodiments described above, has the following steps: pushing the first securing device onto the shaft to a predetermined position such that the first securing device is located above the first groove; deforming or caulking the first securing device in the first groove, so that the first interlocking connection is formed; mounting the shaft component onto the shaft; mounting the second securing device onto the shaft up to a predetermined position or until a predetermined axial pretensioning force is reached, in such a way that the second securing device is located above the second groove; deforming or caulking the second securing device in the second groove so that the second interlocking connection is formed.

BRIEF DESCRIPTION OF THE DRAWINGS

The disclosure is explained in more detail below using the exemplary embodiment shown in the figures. In the figures.

DETAILED DESCRIPTION

The following is a description of one embodiment according to the present disclosure.

Figure 1A:
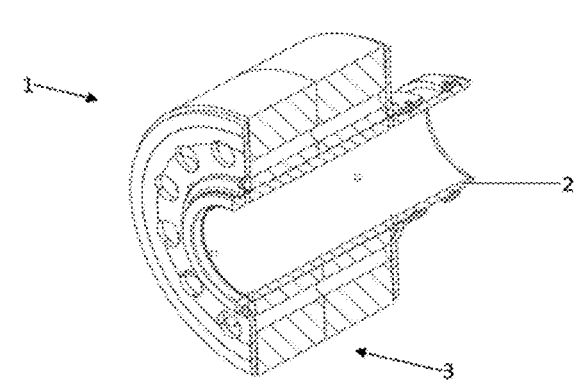
FIG. 1 shows a perspective sectional view and a projection of the sectional view of the shaft system.
Figure 1B:
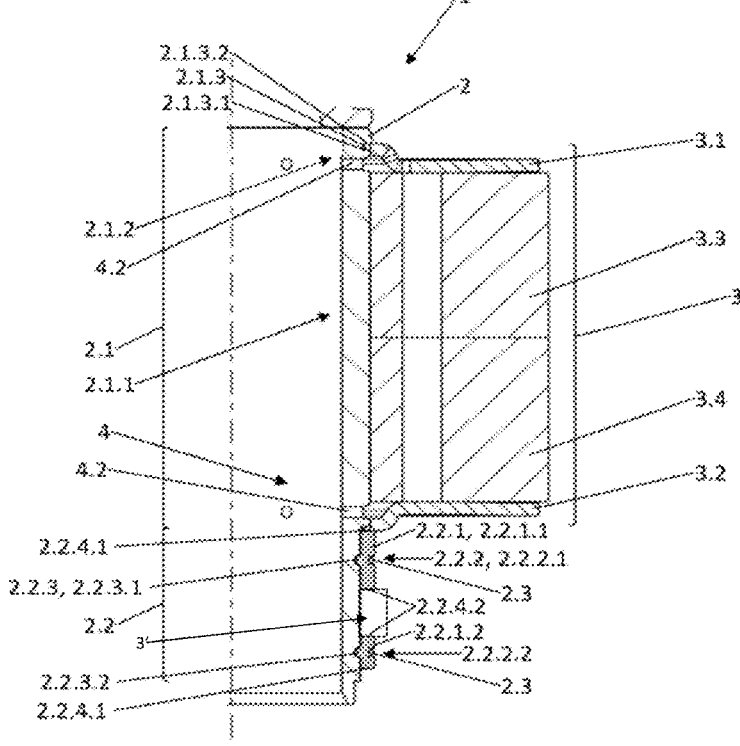

FIG. 1 shows a perspective sectional view and a projection of the sectional view of the shaft system 1 from FIG. 1. The shaft system 1 comprises a shaft 2, which has a first shaft portion 2.1 and a second shaft portion 2.2.

In the first portion, a shaft component 3 is mounted on the shaft 2. The shaft component 3 comprises a first balancing disk 3.1, a second balancing disk 3.2, a first laminated core 3.3 and a second laminated core 3.4. The balancing disks 3.1, 3.2 are designed to be potted so that coolant from a cooling system 4 can be fed via cooling channels 4.1 and associated bores 4.2 from the shaft 1 in the direction of the laminated cores 3.3, 3.4. A further advantage of the potted design can be seen in a spring effect of the balancing disks 3.1, 3.2, whereby a defined axial pretensioning force can be applied based on a characteristic spring curve in combination with the axial position of the second balancing disk 3.2 and tolerances due to thermal expansion can be compensated for.

Figure 2:
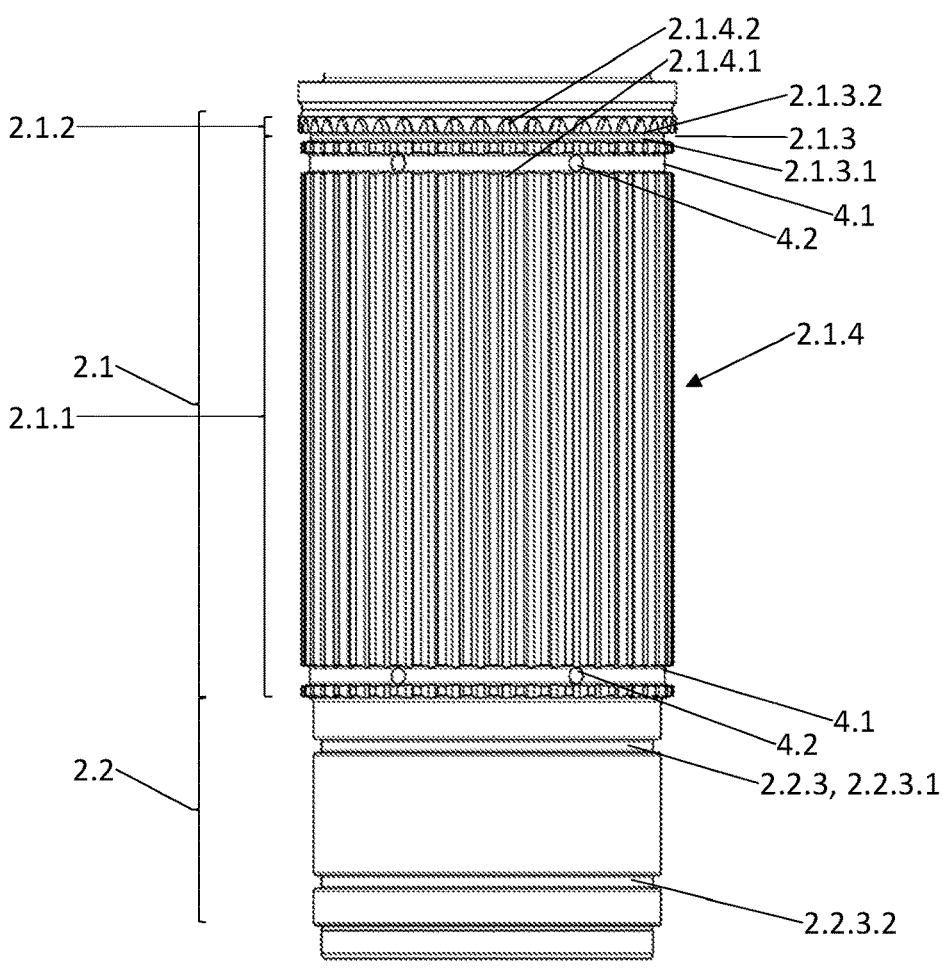
FIG. 2 shows a top view of the shaft of the shaft system from FIG. 1.

The first shaft portion 2.1 has a profile 2.1.4 which is formed in the radial direction, extends inwards in the axial direction, has a constant cross-section in a first region 2.1.1, and is open on one side of the shaft portion in the axial direction towards the second shaft portion 2.2, see also FIG. 2.

The shaft component 3 is pushed onto the first shaft portion from the direction of the second shaft portion 2.2 and is secured against rotation by means of a counter-profile corresponding to the constant cross-section of the first region 2.1.1 and is designed to transmit forces bidirectionally in the circumferential direction from the shaft component 3 to the shaft 2.

Figure 3:
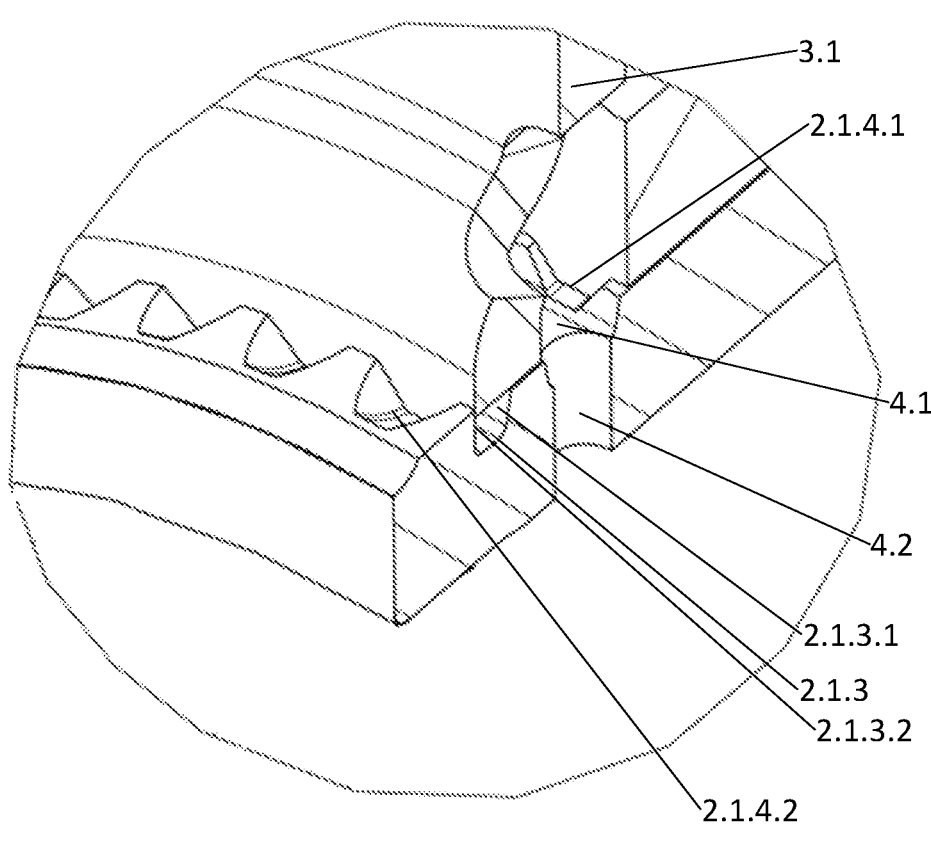
FIG. 3 shows a perspective sectional view of a detail of the shaft system, from Figure.

The first region 2.1.1 is adjoined by a second region 2.1.2 in which the profile 2.1.4 has a taper 2.1.4.2, which is illustrated in FIG. 3.

A peripheral groove 2.1.3 extending in the circumferential direction is introduced between the first region 2.1.1 and the second region 2.1.2, which forms a first groove flank 2.1.3.1 in the first region 2.1.1 and a second groove flank 2.1.3.2 in the second region 2.1.2. Due to the taper 2.1.4.2 (see FIG. 3), the second groove flank 2.1.3.2 forms an axial stop of the profile 2.1.4 in the second region 2.1.2, or represents an axial stop for the corresponding counter-profile of the shaft component 3 respectively. In the present embodiment, this is implemented by the first balancing disk 3.1 interacting with the second groove flank 2.1.3.2.

On the side opposite the first balancing disk 3.1, the second balancing disk 3.2 is in contact with a securing device 2.2.1. The securing device 2.2.1 thus represents a stop in the second shaft portion 2.2 in the axial direction for the shaft component 3.

In the region of the second shaft portion 2.2, the shaft 2 has a peripheral groove 2.2.3. The securing device 2.2.1 forms an interlocking connection 2.2.2 to the groove 2.2.3 by deformation 2.3 (see FIG. 3) of the securing device 2.2.1 into the groove 2.2.3.

The securing device 2.2.1 is designed as a sleeve made of a tubular material. The material thickness in the embodiment shown can be regarded as constant in the circumferential direction as well as in the axial direction, so that a constant wall thickness can be assumed. In this regard, the axial extension of the sleeve is selected in such a way that manufacturing tolerances, for example of the shaft 2 and the shaft component 3, are compensated for and thus the securing device 2.2.1 is arranged above the groove 2.2.3 in such a way that the interlocking connection 2.2.2 is implemented in a reliable manner.

The securing device 2.2.1 has a first axial stop 2.2.4.1 for the shaft component 3, in the specific embodiment for the second balancing disk 3.2, as well as a second axial stop 2.2.4.2, which is arranged on the side of the securing device 2.2.1 opposite the first axial stop 2.2.4.1. The second axial stop 2.2.4.2 serves as a stop for a further shaft component 3'.

If the further shaft component 3' is to be axially secured, a first groove 2.2.3.1 and a second groove 2.2.3.2 are introduced into the shaft 2 in the second shaft portion 2.2. Furthermore, the second shaft portion 2.2 has a first securing device 2.2.1.1 and a second securing device 2.2.1.2. In this regard, the first securing device 2.2.1.1 forms the first interlocking connection 2.2.2.1 to the first groove 2.2.3.1 at a first location on the shaft 2. The second securing device 2.2.1.2 forms the second interlocking connection 2.2.2.2 to the second groove 2.2.3.2 at a second location of the shaft. The further shaft component 3' is then arranged between the securing devices 2.2.1.1, 2.2.1.2. In a variant of the embodiment, this can be, for example, a bearing element or a rotational position sensor.

Both securing devices 2.2.1.1, 2.2.1.2 each have a first stop 2.2.4.1 and a second stop 2.2.4.2.

FIG. 2 shows a top view of the shaft 2 of the shaft system 1 from FIG. 1.

The shaft 2 comprises two shaft portions 2.1 and 2.2. In the first shaft portion 2.1, the profile 2.1.4, which is pronounced in the axial direction, can be seen. The profile 2.1.4 is interrupted by radially peripheral cooling channels 4.1 of the cooling system 4, which allow coolant to flow via bores 4.2.

In the second shaft portion 2.2, which directly adjoins the first shaft portion 2.1, the first groove 2.2.3.1 and the second groove 2.2.3.2 can be seen.

In the second region 2.1.2 of the first shaft portion 2.1, the taper 2.1.4.2 of the profile 2.1.4 can be seen, located above the groove 2.1.3 in the top view. The taper 2.1.4.2 is created due to the manufacturing process of the profile tracks 2.1.4.1, for example, when a profile cutter is moved out. In particular, the taper 2.1.4.2 is designed as a reduction of the profile width in the circumferential direction as well as a reduction of the profile depth in the radial direction.

Furthermore, the first region 2.1.1 has a first tip diameter of the shaft 2 and the second region 2.1.2 has a second tip diameter of the shaft 2, wherein the second tip diameter is larger than the first tip diameter.

The groove 2.1.3 forms a first groove flank 2.1.3.1 in the first region 2.1.1 and a second groove flank 2.1.3.2 in the second region 2.1.2. Due to the taper 2.1.4.2, the second groove flank 2.1.3.2 forms an axial boundary of the profile 2.1.4 in the second region 2.1.2, or represents an axial stop for the corresponding counter-profile of the shaft component 3 respectively. The larger tip diameter in the second region 2.1.2 additionally increases the area of the axial stop.

FIG. 3 shows a perspective sectional view of a detail of the shaft system from FIG. 1 to illustrate the assembly situation.

Figure 4:
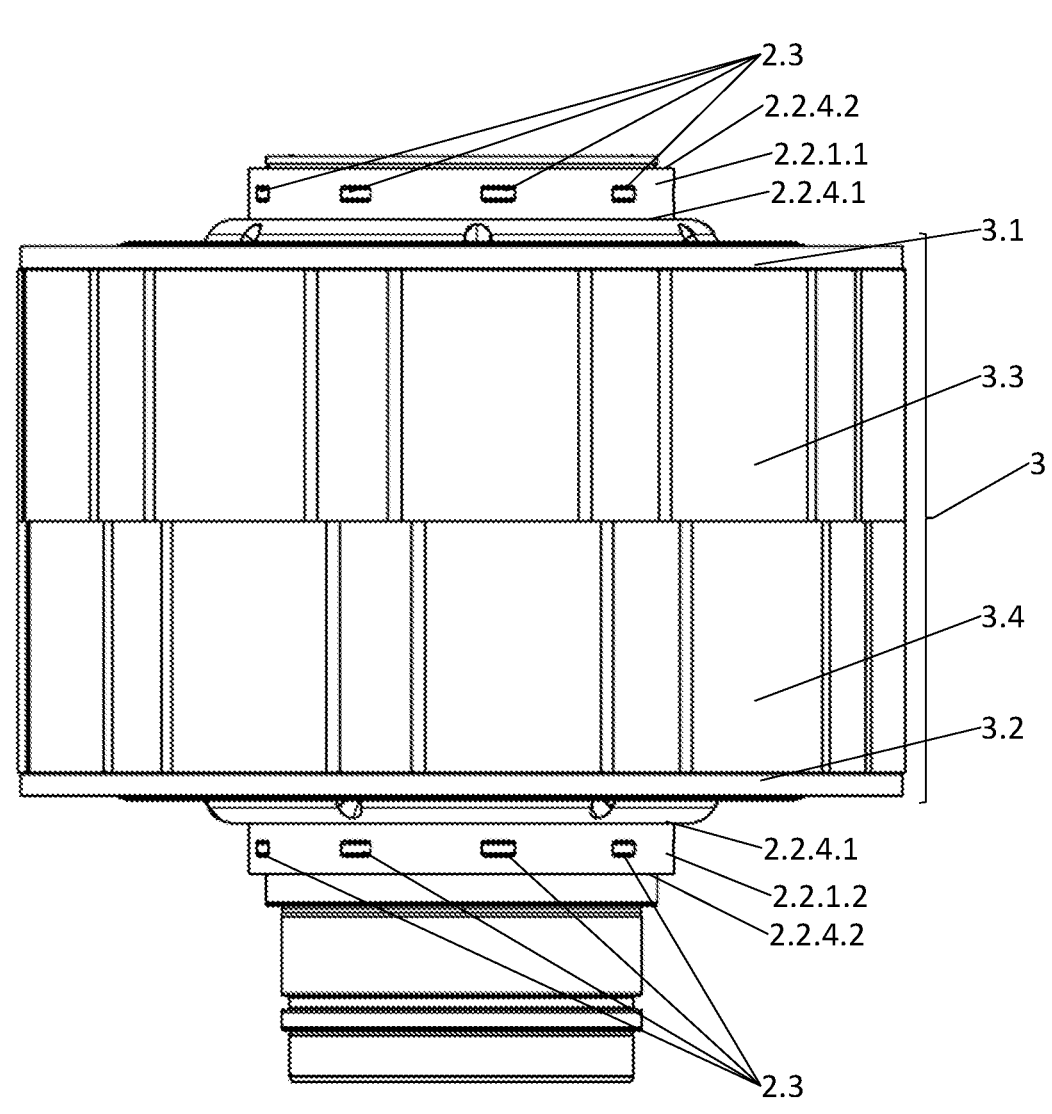
FIG. 4 shows a top view of a variant of the shaft system according to FIG. 1.

FIG. 4 shows a top view of a variant of the shaft system 1 according to FIG. 1 and FIG. 2. For axially securing the shaft component 3, a first securing device 2.2.1.1 and a second securing device 2.2.1.2 are provided in the variant. Here, the first balancing disk 3.1 is in contact with a first stop 2.2.4.1 of the first securing device 2.2.1.1. The first securing device 2.2.1.1 forms a first interlocking connection 2.2.2.1 to a first groove 2.2.3.1 of the shaft 2. The first interlocking connection 2.2.2.1 is therein implemented via multiple radial deformations 2.3 of the first securing device 2.2.1.1 into the first groove 2.2.3.1.

The second balancing disk 3.2 is in contact with a first stop 2.2.4.1 of the second securing device 2.2.1.2. The second securing device 2.2.1.2 forms a second interlocking connection 2.2.2.2 to a second groove 2.2.3.2 of the shaft 2. The second interlocking connection 2.2.2.2 is implemented in this case by multiple radial deformations 2.3 of the second securing device 2.2.1.2 into the second groove 2.2.3.2.

Both securing devices 2.2.1.1, 2.2.1.2 have a first stop 2.2.4.1 and a second stop 2.2.4.2.

The securing devices 2.2.1.1, 2.2.1.2 are each designed as a sleeve made of a tubular material. The material thickness in the present embodiment can be regarded as constant in the circumferential direction as well as in the axial direction, so that a constant wall thickness can be assumed.

In the production of the illustrated variant of the shaft system 1, the first securing device 2.2.1.1 is pushed on until a predetermined position is reached. In this case, the first securing device 2.2.1.1 is arranged above the first groove 2.2.3.1 in such a way that a first interlocking connection 2.2.2.1 is formed by means of a deformation 2.3 of the securing device 2.2.1.1 into the first groove 2.2.3.1. The shaft component 3 is then pushed onto the shaft 2. The second securing device 2.2.1.2 is then pushed on up to a predetermined position or until a predetermined axial pre-tensioning force is reached, so that the second securing device 2.2.1.2 is arranged above the second groove 2.2.3.2 in such a way that a second interlocking connection 2.2.2.2 is formed by means of a deformation 2.3 of the securing device 2.2.1.2 into the second groove 2.2.3.2.

LIST OF REFERENCE SIGNS

1 Shaft system
2 Shaft
2.1 First shaft portion
2.1.1 First region
2.1.2 Second region
2.1.3 Groove
2.1.3.1 First groove flank
2.1.3.2 Second groove flank
2.1.4 Profile
2.1.4.1 Profile track
2.1.4.2 Taper
2.2 Second shaft portion
2.2.1 Securing device
2.2.1.1 First securing device
2.2.1.2 Second securing device
2.2.2 Interlocking connection
2.2.2.1 First interlocking connection
2.2.2.2 Second interlocking connection
2.2.3 Groove
2.2.3.1 First groove
2.2.3.2 Second groove
2.2.4.1 First stop
2.2.4.2 Second stop
2.3 Deformation
3 Shaft component
3.1 First balancing disk
3.2 Second balancing disk
3.3 First laminated core
3.4 Second laminated core
4 Cooling system
4.1 Cooling channel
4.2 Bore

The invention claimed is:

1. A shaft system, comprising:
a shaft with a peripheral groove extending in a circumferential direction;
a shaft component;
a securing device;
an interlocking connection formed by a deformation of the securing device into the groove;
the securing device forms a first axial stop for the shaft component; and the securing device includes a second axial stop;
wherein the peripheral groove includes a first peripheral groove extending in the circumferential direction and a second peripheral groove extending in the circumferential direction, the securing device includes a first securing device and a second securing device, each of which comprises the interlocking connection, the first stop and the second stop, the first securing device has the first interlocking connection to the first groove at a first location on the shaft, and the second securing device has the second interlocking connection to the second groove at a second location of the shaft, wherein the shaft component is arranged adjacent the first axial stop of the first securing device and a further shaft component is arranged between the second axial stop of the first securing device and the second axial stop of the second securing device; and wherein the shaft component and the further shaft component are on opposite axial sides of the first securing device.

2. The shaft system according to claim 1, wherein the securing device is tubular with a constant wall thickness in a region of the deformation.

3. The shaft system according to claim 1, wherein the interlocking connection comprises a plurality of radial deformations of the securing device into the groove that are distributed in the circumferential direction.

4. The shaft system according to claim 1, wherein the first securing device and the second securing device are identical components.

5. The shaft system according to claim 1, wherein the shaft component includes multiple parts.

6. The shaft system according to claim 1, wherein the shaft component is a rotor core of an electric machine comprising a first balancing disk and a first laminated core.

7. An electric machine comprising the shaft system according to claim 1.

8. A shaft system, comprising: a shaft with a peripheral groove extending in a circumferential direction; a shaft component located on the shaft; a ring-shaped securing device; a radial deformation of the ring-shaped securing device into the groove forming an interlocking connection of the securing device to the shaft; the ring-shaped securing device forms a first axial stop for the shaft component; and the ring-shaped securing device includes a second axial stop, wherein the peripheral groove includes a first peripheral groove extending in the circumferential direction and a second peripheral groove extending in the circumferential direction, the securing device includes a first securing device and a second securing device, each of which comprises the radial deformation forming the interlocking connection, the first stop and the second stop, the first securing device has the radial deformation forming the first interlocking connection to the first groove at a first location on the shaft, and the second securing device has the radial deformation forming the second interlocking connection to the second groove at a second location of the shaft, wherein the shaft component is arranged between the first axial stop of the first securing device and the first axial stop of the second securing device, and a further shaft component is arranged between the second axial stop of the first securing device and the second axial stop of the second securing device; and wherein the shaft component and the further shaft component are on opposite axial sides of the first securing device.

9. The shaft system according to claim 8, wherein the ring-shaped securing device has a constant wall thickness in a region of the radial deformation.

10. The shaft system according to claim 8, wherein the radial deformation comprises a plurality of radial deformations that extend into the groove and are distributed in the circumferential direction.

11. The shaft system according to claim 8, wherein the first securing device and the second securing device are identical components.

12. The shaft system according to claim 8, wherein the shaft component includes multiple parts.

13. The shaft system according to claim 8, wherein the shaft component is a rotor core of an electric machine comprising a first balancing disk and a first laminated core.

* * * * *